US012557194B2

(12) United States Patent
Xing

(10) Patent No.: US 12,557,194 B2
(45) Date of Patent: Feb. 17, 2026

(54) SAFETY PROTECTION DEVICE FOR LED DISPLAY SCREEN AND LED DISPLAY SYSTEM

(71) Applicant: UNILUMIN GROUP CO., LTD, Shenzhen (CN)

(72) Inventor: Qianghong Xing, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 261 days.

(21) Appl. No.: 18/504,489

(22) Filed: Nov. 8, 2023

(65) Prior Publication Data

US 2024/0414825 A1 Dec. 12, 2024

(30) Foreign Application Priority Data

Jun. 7, 2023 (CN) ......................... 202321442635.8

(51) Int. Cl.

| | |
|---|---|
| ***H05B 45/50*** | (2022.01) |
| ***G08B 5/36*** | (2006.01) |
| ***G08B 17/10*** | (2006.01) |
| ***H05B 45/20*** | (2020.01) |

(52) U.S. Cl.

CPC ............... *H05B 45/50* (2020.01); *G08B 5/36* (2013.01); *G08B 17/10* (2013.01); *H05B 45/20* (2020.01)

(58) Field of Classification Search

CPC ........ G08B 21/182; G08B 25/14; G08B 3/10; G08B 5/22; G08B 21/12; G08B 17/125; G08B 17/10

See application file for complete search history.

(56) References Cited

U.S. PATENT DOCUMENTS

2021/0209915 A1 7/2021 Antar et al.

FOREIGN PATENT DOCUMENTS

| | | | | |
|---|---|---|---|---|
| CN | 114518503 A | 5/2022 | | |
| KR | 101895849 B1 | 9/2018 | | |
| KR | 102237862 B1 | 4/2021 | | |
| WO | WO-2014047501 A1 * | 3/2014 | ................ | H02J 3/00 |

OTHER PUBLICATIONS

European Search Report issued in counterpart European Patent Application No. EP 23206942.7, dated Apr. 23, 2024.

* cited by examiner

*Primary Examiner* — Monica C King
(74) *Attorney, Agent, or Firm* — Westbridge IP LLC

(57) ABSTRACT

Disclosed are a safety protection device for a light-emitting diode (LED) display screen and an LED display system. The safety protection device includes an environment detection unit configured to detect environmental data of an environment where the LED display screen is located; and a host computer configured to receive the environmental data, and reduce a workload of the LED display screen in response to that the environmental data is greater than a preset environmental threshold. The environment detection unit is provided at the LED display screen and connected to the host computer, and the host computer is connected to the LED display screen.

16 Claims, 6 Drawing Sheets

SAFETY PROTECTION DEVICE FOR LED DISPLAY SCREEN AND LED DISPLAY SYSTEM

CROSS-REFERENCE TO RELATED APPLICATIONS

This application claims priority to Chinese Patent Application No. 202321442635.8, filed on Jun. 7, 2023, the entire contents of which are incorporated herein by reference.

TECHNICAL FIELD

The present application relates to the technical field of display screens, and in particular to a safety protection device for a light-emitting diode (LED) display screen and an LED display system.

BACKGROUND

With the continuous advancement of science and technology, the light-emitting diode (LED) display industry has developed rapidly for more than 20 years, and has been widely applied in various fields such as commercial displays, conferences, performing arts, and traffic instructions, creating a huge demand and application market. However, the products in the LED display market are mixed, the technical capabilities of different manufacturers are different, or the product design, material selection or acceptance requirements of LED display screens are different, resulting in different quality levels of LED display screens. Furthermore, due to different external environments, some regions where LED displays are installed have to deal with extreme weather conditions such as high temperatures, severe cold, strong winds, and heavy rainfall, leading to frequent accidents such as fire and other safety accidents caused by LED display failures. These accidents result in significant losses to users and bring about economic loss and negative societal impacts.

Thus, how to ensure the operational safety of LED displays and minimize the occurrence of fire and similar accidents is still an urgent problem to be solved.

SUMMARY

Based on the above objectives, it is necessary to address the above technical problems and provide a safety protection device for a light-emitting diode (LED) display screen and an LED display system that can ensure the safe operation of the LED display screen.

In a first aspect, the present application provides a safety protection device for an LED display screen, including an environment detection unit, configured to detect environmental data of an environment where the LED display screen is located; and a host computer, configured to receive the environmental data, and reduce a workload of the LED display screen in response to that the environmental data is greater than a preset environmental threshold, the environment detection unit is provided at the LED display screen and connected to the host computer, and the host computer is connected to the LED display screen.

In an embodiment, the safety protection device for the LED display screen further includes an alarm unit connected to the host computer, the host computer is configured to send an alarm instruction to the alarm unit in response to that the environmental data is greater than the preset environmental threshold.

In an embodiment, the environmental data includes smoke concentration data, temperature data and humidity data, the environment detection unit includes a smoke detection module, and a temperature and humidity detection module, and both the smoke detection module and the temperature and humidity detection module are provided at the LED display screen, and both the smoke detection module and the temperature and humidity detection module are connected to the host computer.

In an embodiment, the smoke detection module includes a smoke sensor and a converter, the smoke sensor is provided at the LED display screen, and is connected to the host computer via the converter, and the converter is configured to receive the smoke concentration data sent by the smoke sensor, and send the smoke concentration data after format conversion to the host computer.

In an embodiment, the smoke detection module further includes a reset circuit, a heating circuit, an integrating circuit and an output circuit, the reset circuit is connected to the converter, the heating circuit is connected to the converter and the smoke sensor, and is grounded, the integrating circuit is connected to the converter and the smoke sensor, and is grounded, and the converter is configured to output the smoke concentration data after format conversion to the host computer via the output circuit.

In an embodiment, the smoke detection module further includes a test circuit and an indication circuit, and both the test circuit and the indication circuit are connected to the converter.

In an embodiment, the temperature and humidity detection module includes a temperature and humidity sensor, and the temperature and humidity sensor is provided at the LED display screen and connected to the host computer.

In an embodiment, the safety protection device for the LED display screen further includes a power supply unit connected to the environment detection unit.

In an embodiment, the safety protection device for the LED display screen further includes a display unit connected to the host computer.

In a second aspect, the present application further provides an LED display system including an LED display screen and the safety protection device for the LED display screen as mentioned above.

The above-mentioned safety protection device for the LED display screen and the LED display system include an environment detection unit and a host computer. The environment detection unit provided at the LED display screen is configured to detect the environmental data of the environment where the LED display screen is located. The host computer can receive the environmental data, and can reduce the workload of the LED display screen when the environmental data is greater than a preset environmental threshold. The workload of the LED display screen is adjusted when the environmental data is greater than the preset environmental threshold, so that fire and similar accidents can be avoided, and the operation safety of the LED display screen can be ensured as much as possible.

DETAILED DESCRIPTION OF THE EMBODIMENTS

In order to make the purpose, technical solution and advantages of the present application clearer, the present application will be further described in detail below in conjunction with the accompanying drawings and embodiments. It should be understood that the specific embodiments described here are only used to explain the present application, and are not intended to limit the present application.

It can be understood that the descriptions associated with, e.g., "first" and "second", etc., in the present disclosure are merely used for describing various elements, but these elements are not limited by these descriptions. These descriptions are only used to distinguish one element from another element. For example, a first resistor could be described as a second resistor, and, similarly, a second resistor could be described as a first resistor, without departing from the scope of the present application. Both the first resistor and the second resistor are resistors, but they are not the same resistor.

It can be understood that, if the connected circuits, modules, units, have the transmission of electrical signals or data between each other, the term "connection" in the following embodiments should be understood as "electrical connection", "communication connection", etc.

The singular forms "a", "an" and "the/this" used herein may also include the plural forms unless the context clearly dictates otherwise. It should also be understood that terms "including/include" or "have", etc., specify the presence of the features, integers, steps, operations, components, parts, or the combinations thereof. However, those terms do not exclude the possibility of the presence or addition of one or more other features, integers, steps, operations, components, parts, or the combinations thereof.

Unless otherwise defined, all technical and scientific terms used herein have the same meaning as commonly understood by those skilled in the art. The terms used in the present application are only for the purpose of describing specific embodiments, and are not intended to limit the application.

Figure 1:
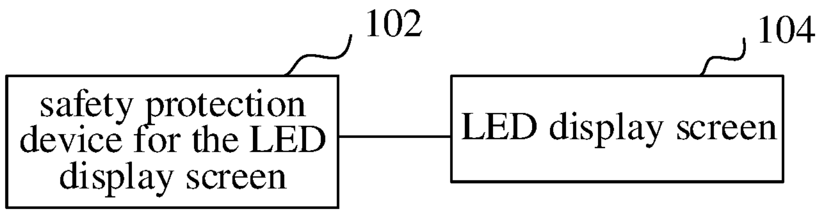
FIG. 1 is an application environment diagram of a safety protection device of a light-emitting diode (LED) display screen according to an embodiment of the present application.

The safety protection device for the light-emitting diode (LED) display screen provided in the embodiments of the present application can be applied in the environment as shown in FIG. 1. The safety protection device 102 for the LED display screen is provided at the LED display screen 104, and the operation environment of the LED display screen 104 may be an outdoor or indoor environment with high altitude, high temperature, drought, humidity, and strong wind. To ensure the smooth and safe operation of LED display screen 104, the safety protection device 102 for the LED display screen detects the environmental data of the environment where the LED display screen 104 is located. When the environmental data is greater than the predetermined environmental threshold, the safety protection device 102 for the LED display screen will reduce the workload of the LED display screen 104. The model and size of the LED display screen 104 are not limited, as long as the environmental data of the LED display screen 104 can be detected by the safety protection device 102 for the LED display screen. When the volume of the LED display screen 104 is too large, a plurality of safety protection devices 102 for the LED display screen can be installed to detect the divided areas of the LED display screen 104.

Figure 2:
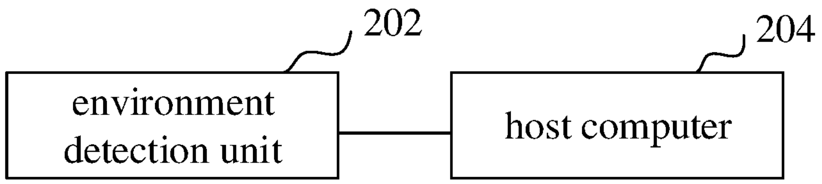
FIG. 2 is a structural schematic diagram of the safety protection device for the LED display screen according to an embodiment.

In an embodiment, as shown in FIG. 2, a safety protection device 102 for an LED display screen is provided, which includes an environment detection unit 202 and a host computer 204. The environment detection unit 202 is configured to detect environmental data of an environment where the LED display screen 104 is located. The host computer 204 is configured to receive the environmental data, and reduce a workload of the LED display screen 104 when the environmental data is greater than a preset environmental threshold. The environment detection unit 202 is provided at the LED display screen 104 and connected to the host computer 204, and the host computer 204 is connected to the LED display screen 104.

The environment detection unit 202 can detect environmental data. When the environment detection unit 202 is provided at the LED display screen 104, the environment detection unit 202 detects the environmental data of the environment where the LED display screen 104 is located. The host computer 204 is a chip or a computer with certain software algorithm capabilities, and preset environmental thresholds are stored therein. The host computer 204 can receive the environmental data detected by the environment detection unit 202, and will compare the environmental data with the stored preset environmental threshold. When the environmental data is greater than the preset environmental threshold, the host computer 204 can output a safety instruction, and the safety instruction is used to reduce the workload of the LED display screen 104.

The environment detection unit 202 detects the environmental data of the environment where the LED display screen 104 is located, and the environmental data may be values of environmental parameters such as temperature and humidity of the LED display screen 104 that may affect the operation state of the LED display screen 104. The environment detection unit 202 transmits the detected environmental data to the host computer 204. The host computer 204 receives the environmental data and compares the environmental data with the stored preset environment threshold. If the environmental data is less than or equal to the preset environmental threshold, it indicates that the environment of the LED display screen 104 is safe, and the host computer 204 will not interfere with the operation state of the LED display screen 104. If the environmental data is greater than the preset environmental threshold, it indicates that there are risks in the environment of the LED display screen 104, and the host computer 204 will output a safety instruction to the LED display screen 104 to reduce the workload of the LED display screen 104.

In an embodiment, according to the different environmental data of the environment where the LED display screen 104 is located, there are correspondingly different risk levels. In response to different risk levels, the safety instructions sent by the host computer 204 to the LED display screen 104 include the power-off instruction and the low energy consumption instruction. The power-off instruction is used to control the LED display screen 104 to disconnect from the power supply, and reduce the workload of the LED display screen 104 to zero. The low energy consumption instruction is used to control the LED display screen 104 to switch to a low energy mode, to reduce the workload of the LED display screen 104. The workload of the LED display screen 104 in the low-energy mode is not unique, and the LED display screen 104 with different models and usages in the low-power modes may have different workloads.

In this embodiment, the safety protection device 102 for the LED display screen includes an environment detection unit 202 and a host computer 204. The environment detection unit 202 provided at the LED display screen 104 is configured to detect the environmental data of the environment where the LED display screen 104 is located. The host computer 204 can receive the environmental data, and can reduce the workload of the LED display screen 104 when the environmental data is greater than a preset environmental threshold. The workload of the LED display screen 104 is adjusted when the environmental data is greater than the preset environmental threshold, so that fire and similar accidents can be avoided, and the operation safety of the LED display screen 104 can be ensured as much as possible.

Figure 3:
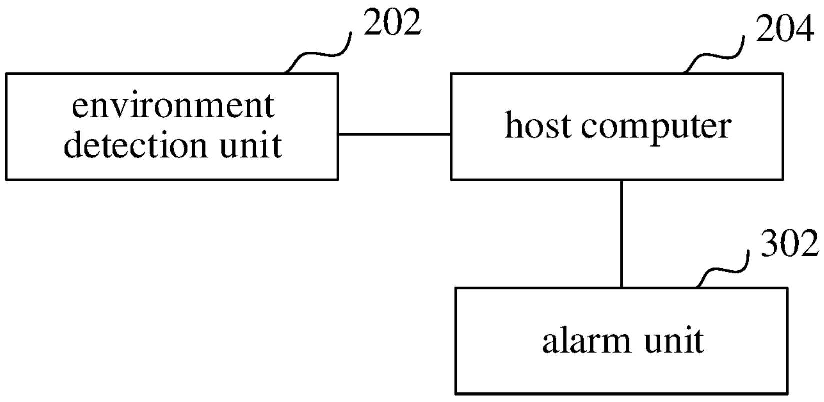
FIG. 3 is a structural schematic diagram of the safety protection device for the LED display screen according to another embodiment of the present application.

In an embodiment, as shown in FIG. 3, the safety protection device 102 for the LED display screen also includes an alarm unit 302, and the alarm unit 302 is connected to the host computer 204. When the environmental data is greater than the preset environmental threshold, the host computer 204 sends an alarm instruction to the alarm unit 302.

The alarm unit 302 has an alarm function, and can generate alarm information such as sound alarm information, optical alarm information, and vibration alarm information. In an embodiment, the alarm unit 302 is connected to the host computer 204. When the host computer 204 receives the environmental data and compares the environmental data with the stored preset environmental threshold, if the environmental data is greater than the preset environmental threshold, it indicates that there are risks in the environment of the LED display screen 104. In this case, the host computer 204 outputs a safety instruction to the LED display screen 104 to reduce the workload of the LED display screen 104. The host computer 204 also outputs an alarm instruction to the alarm unit 302, and the alarm instruction is used to instruct the alarm unit 302 to generate alarm information. After receiving the alarm instruction, the alarm unit 302 generates corresponding alarm information to remind the operation personnel of the abnormal environment of the LED display screen 104.

In an embodiment, the type of the alarm unit 302 is not limited, and the alarm unit 302 may be an audible and visual alarm, a vibration alarm, or an intelligent cloud alarm. By setting the alarm unit 302, the alarm information is sent out when the environmental data is greater than the preset environmental threshold, to promptly remind the operation personnel to pay attention to the LED display screen 104, and take human intervention when necessary, thereby further ensuring the operation safety of the LED display screen 104.

Figure 4:
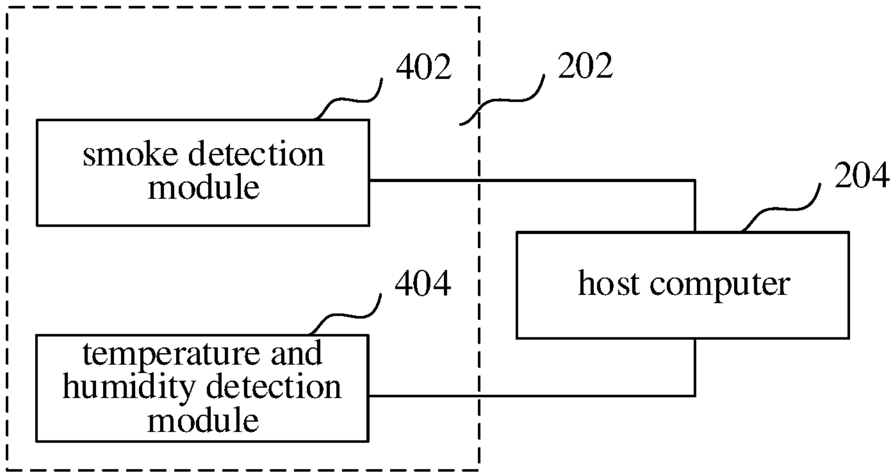
FIG. 4 is a structural schematic diagram of the safety protection device for the LED display screen according to yet another embodiment of the present application.

In an embodiment, as shown in FIG. 4, environmental data includes smoke concentration data, temperature data and humidity data. The environment detection unit 202 includes a smoke detection module 402 and a temperature and humidity detection module 404. Both the smoke detection module 402 and the temperature and humidity detection module 404 are provided at the LED display screen 104, and both the smoke detection module 402 and the temperature and humidity detection module 404 are connected to the host computer 204.

In this embodiment, multi-dimensional environment detection units 202 are set to detect the environmental data of the environment where the LED display screen 104 is located, to make the obtained environmental data more comprehensive. In an embodiment, the smoke detection module 402 and the temperature and humidity detection module 404 are provided at the LED display screen 104. The smoke detection module 402 can detect the smoke concentration data of the environment where the LED display screen 104 is located, and the temperature and humidity detection module 404 can detect temperature data and humidity data of the environment where the LED display screen 104 is located. Both the smoke detection module 402 and the temperature and humidity detection module 404 are connected to the host computer 204, and the host computer 204 receives the smoke concentration data sent by the smoke detection module 402, and receives the temperature data and the humidity data sent by the temperature and humidity detection module 404. Correspondingly, the host computer 204 stores the smoke concentration threshold, the temperature threshold and the humidity threshold. The host computer 204 compares the smoke concentration data with the smoke concentration threshold, the temperature data with the temperature threshold, and the humidity data with the humidity threshold. If the smoke concentration data, temperature data and humidity data are all less than or equal to the corresponding thresholds, it means that the environment where the LED display screen 104 is located is safe, and the host computer 204 will not interfere with the operation state of the LED. In other cases, the host computer 204 will send safety instructions to the LED display screen 104 to reduce the workload of the LED display screen 104. Details are illustrated as follows.

Safety instructions include power-off instructions and low energy consumption instructions. When the smoke concentration data is greater than the smoke concentration threshold, the host computer 204 sends a power-off instruction to the LED display screen 104 to reduce the workload of the LED display screen 104 to zero. When the temperature data is greater than the temperature threshold and/or the humidity data is greater than the humidity threshold, the host computer 204 sends a low energy consumption instruction to the LED display screen 104 to reduce the workload of the LED display screen 104.

The value of the smoke concentration threshold is not limited, which may be 1000 ppm, 2000 ppm, or any value in the range of 1000 ppm to 2000 ppm. The value of the temperature threshold is not limited, which may be 65° C., 75° C., or any value between 65° C. and 75° C. The humidity threshold is not limited, and a humidity of 90% may be taken as the humidity threshold.

In this embodiment, the smoke detection module 402 and the temperature and humidity detection module 404 are used to detect the environmental data of the environment where the LED display screen 104 is located, the environment where the LED display screen 104 is located can be detected in multiple dimensions to ensure the safety operation of the LED display screen 104.

Figure 5:
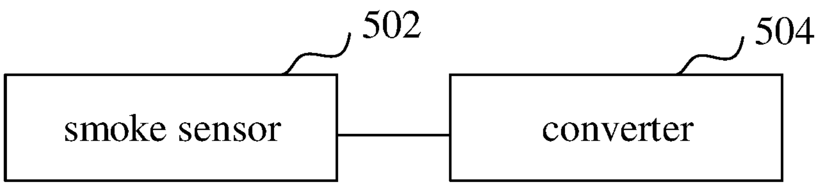
FIG. 5 is a structural schematic diagram of a smoke detection module according to an embodiment of the present application.

In an embodiment, as shown in FIG. 5, the smoke detection module 402 includes a smoke sensor 502 and a converter 504. The smoke sensor 502 is provided at the LED display screen 104, and the smoke sensor 502 is connected to the host computer 204 via the converter 504. The converter 504 receives the smoke concentration data sent by the smoke sensor 502, and sends the smoke concentration data after format conversion to the host computer 204.

The smoke detection module 402 needs the smoke sensor 502 to detect the smoke concentration data. Since the smoke concentration data output by the smoke sensor 502 is in analog format, a converter 504 needs to be connected for converting the smoke concentration data in analog format. The converter 504 will convert the smoke concentration data in the analog format into the smoke concentration data in the digital format, and the host computer 204 will receive the smoke concentration data in the digital format sent by the converter 504. Smoke concentration data in digital format is easy to process and has wide applicability.

Figure 6:
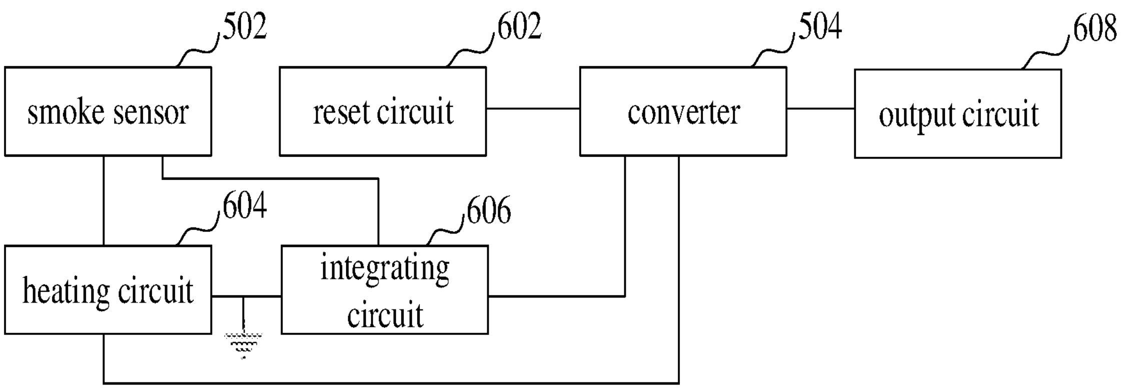
FIG. 6 is a structural schematic diagram of the smoke detection module according to another embodiment of the present application.

In an embodiment, as shown in FIG. 6, the smoke detection module 402 further includes a reset circuit 602, a heating circuit 604, an integrating circuit 606 and an output circuit 608. The reset circuit 602 is connected to the converter 504. The heating circuit 604 is connected to the converter 504 and the smoke sensor 502, and is grounded. The integrating circuit 606 is connected to the converter 504 and the smoke sensor 502, and is grounded. The converter 504 transmits the smoke concentration data after format conversion to the host computer 204 via the output circuit 608.

When the heating circuit 604 is turned on, the heating wire in the smoke sensor 502 is heated, so that the smoke sensor 502 enters the operation state. The integrating circuit 606 is used to sense the operation state of the smoke sensor 502, obtain the smoke concentration data and transmit it to the converter 504. The converter 504 converts the smoke concentration data, and sends the converted smoke concentration data to the host computer 204 via the output circuit 608. The reset circuit 602 is used to ensure the stable operation of the converter 504, and is used to reset the converter 504 to an initial state.

Figure 7:
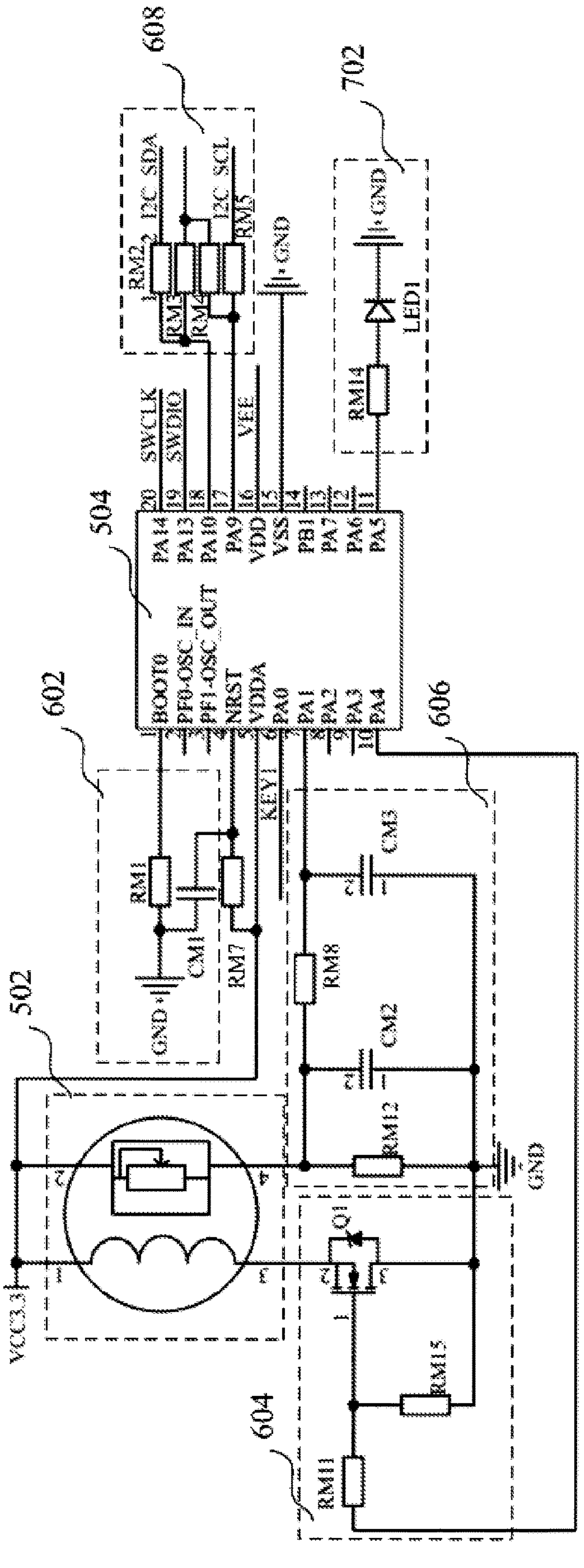
FIG. 7 is a schematic circuit diagram of the smoke detection module according to an embodiment of the present application.

In an embodiment, as shown in FIG. 7, the reset circuit 602 includes a resistor RM1 and a capacitor CM1, and both the resistor RM1 and the capacitor CM1 are grounded. The resistor RM1 is connected to the interface 1 of the converter 504. Both the capacitor CM1 and the voltage divider resistor RM7 are connected to the interface 4 of the converter 504.

The heating circuit 604 includes a resistor RM11, a resistor RM15 and a switch tube Q1. The first terminal of the resistor RM11 is connected to the control terminal of the switch tube Q1 and the resistor RM15, and the second terminal of the resistor RM11 is connected to the interface 10 of the converter 504. Both the input terminal of the switch tube Q1 and the resistor RM15 are grounded, and the output terminal of the switching tube Q1 is connected to the smoke sensor 502. The interface 10 of the converter 504 sends out a PWM pulse signal, and the PWM pulse signal is transmitted to the control terminal of the switch tube Q1 via the resistor RM11, to control the switch tube Q1 to be on or off, thereby controlling whether the smoke sensor 502 enters the operation state. When the switch tube Q1 is turned on, the smoke sensor 502 enters the operation state, and when the switch tube Q1 is turned off, the smoke sensor 502 is turned off. In an embodiment, the switching transistor Q1 may be an NMOS transistor.

When the smoke sensor 502 is in the operation state, the switch tube Q1 is turned on, and the heating wire in the smoke sensor 502 is electrically heated. The heating temperature ranges from 200° C. to 300° C. In an embodiment, the smoke sensor 502 may be an MQ-D2 smoke sensor. The MQ-D2 smoke sensor is made of the tin dioxide semiconductor gas-sensitive material, which belongs to the surface ionic N-type semiconductor. Tin dioxide can absorb oxygen in the air, form negative ion adsorption of oxygen, and reduce the electron density in the semiconductor, thereby increasing the resistor value in the MQ-D2 smoke sensor. The MQ-D2 smoke sensor is applied to gas leakage detection in households and factories, and is suitable for the detection of liquefied petroleum gas, benzene, alkanes, alcohol, hydrogen, smoke and other gases. The MQ-D2 smoke sensor has an extremely wide detection range and is highly sensitive to natural gas, liquefied petroleum gas and other smoke, especially to alkanes smoke. Further, the MQ-D2 smoke sensor has strong anti-interference capabilities and can accurately filter out non-combustible smoke that may be irritating. The MQ-D2 smoke sensor offers stable and reliable operation, with a short response time, good performance for a long time, and a long service life. The driving circuit is simple, and has good repeatability and long-term stability.

The integrating circuit 606 includes a resistor RM12, a capacitor CM2, a resistor RM8, and a capacitor CM3. The first terminal of the resistor RM12, the first terminal of the resistor RM8, and the second terminal of the capacitor CM2 are connected to the smoke sensor 502, and the second terminal of the capacitor CM3 is connected to the second terminal of the resistor RM8 and the interface 7 of the converter 504. The second terminal of the resistor RM12, the first terminal of the capacitor CM2, and the first terminal of the capacitor CM3 are grounded. Via the smoke sensor 502 and the resistor RM12, the voltage VCC (3.3V) is grounded. When the smoke sensor 502 detects that the smoke gas concentration increases, the resistor value of the smoke sensor 502 will decrease, and in this case, the voltage across the resistor RM12 will increase. The voltage data across the resistor RM12 is sent to the interface 7 of the converter 504, and the voltage data represents the smoke concentration data.

The converter 504 converts the received smoke concentration data into corresponding high and low levels. In an embodiment, when the smoke concentration of the environment where the LED display screen 104 is located reaches 1000 ppm, the voltage across the resistor RM12 will reach 1.4V. The converter 504 stores a preset voltage threshold value of 1.4V. When the voltage data received by the converter 504 is less than or equal to 1.4V, the converter 504 will output a low level to the output circuit 608. When the voltage data received by the converter 504 is greater than 1.4V, the converter 504 will output a high level to the output circuit 608.

The output circuit 608 includes a resistor RM2, a resistor RM3, a resistor RM4 and a resistor RM5. Both the first terminal of the resistor RM2 and the first terminal of the resistor RM3 are connected to the interface 18 of the converter 504, and both the first terminal of the resistor RM4 and the first terminal of the resistor RM5 are connected to the interface 17 of the converter 504. The second terminal of the resistor RM3 is connected to the second terminal of the resistor RM4. The output circuit 608 transmits the converted smoke concentration data to the host computer 204 by means of inter-integrated circuit (I2C, two-wire serial bus) communication.

In an embodiment, the smoke detection module 402 further includes a test circuit and an indication circuit 702, and both the test circuit and the indication circuit 702 are connected to the converter 504. As shown in FIG. 7, the test circuit is connected to the interface 6 (marked as KEY1) of the converter 504, and the indication circuit 702 is connected to the interface 11 of the converter 504.

Figure 8:
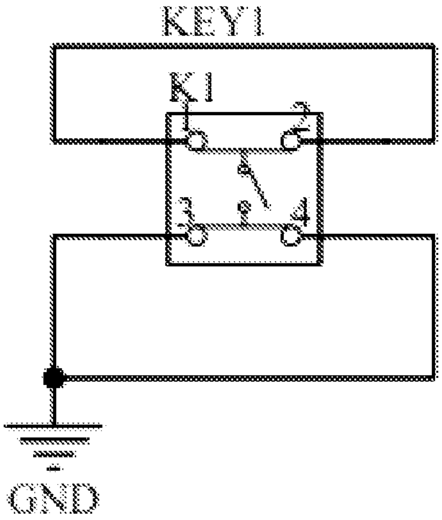
FIG. 8 is a schematic circuit diagram of a test circuit according to an embodiment of the present application.

In an embodiment, as shown in FIG. 8, the test circuit is used as a test button. The test circuit includes a switch K1, and the operating personnel can press the switch K1 to test the smoke concentration. The structure of the indication circuit 702 is shown in FIG. 7. The indication circuit 702 includes a resistor RM14 and the diode LED1, and the resistor RM14 is connected to the positive pole of the diode LED1 in sequence. The negative pole of the diode LED1 is grounded. When the voltage data of RM12 received by the converter 504 is less than or equal to the voltage threshold stored in the converter 504, the converter 504 outputs a low level via the interface 11, and the diode LED1 does not emit light. When the voltage data of RM12 received by the converter 504 is greater than the voltage threshold stored in the converter 504, the converter 504 outputs a high level via the interface 11, and the diode LED1 emits light to remind the operating personnel that the smoke concentration of the environment where LED display screen 104 is located is excessively high.

Figure 9:
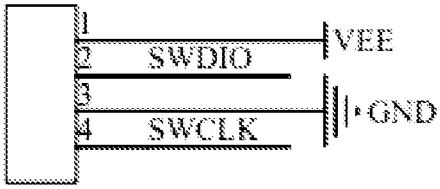
FIG. 9 is a schematic circuit diagram of a connection interface according to an embodiment of the present application.
Figure 10:
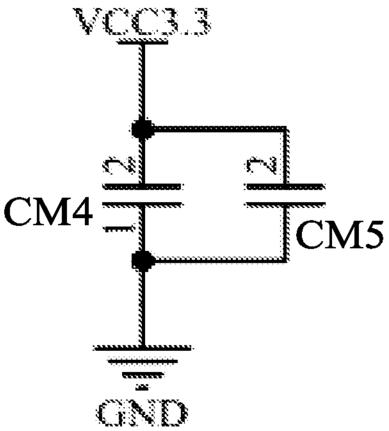
FIG. 10 is a schematic circuit diagram of a voltage stabilizing circuit according to an embodiment of the present application.

Further, the interface 20 (marked SWCLK) and the interface 19 (marked SWDIO) of the converter 504 are the interfaces for downloading programs, and the connection interfaces for downloading programs are shown in FIG. 9. The smoke detection module 402 also includes a voltage stabilizing circuit, as shown in FIG. 10. The voltage VCC (3.3V) is grounded via the capacitors CM4 and CM5 connected in parallel, to stabilize the output of the voltage VCC (3.3V).

In an embodiment, the temperature and humidity detection module 404 includes a temperature and humidity sensor, which is provided at the LED display screen 104 and connected to the host computer 204.

Figure 11:
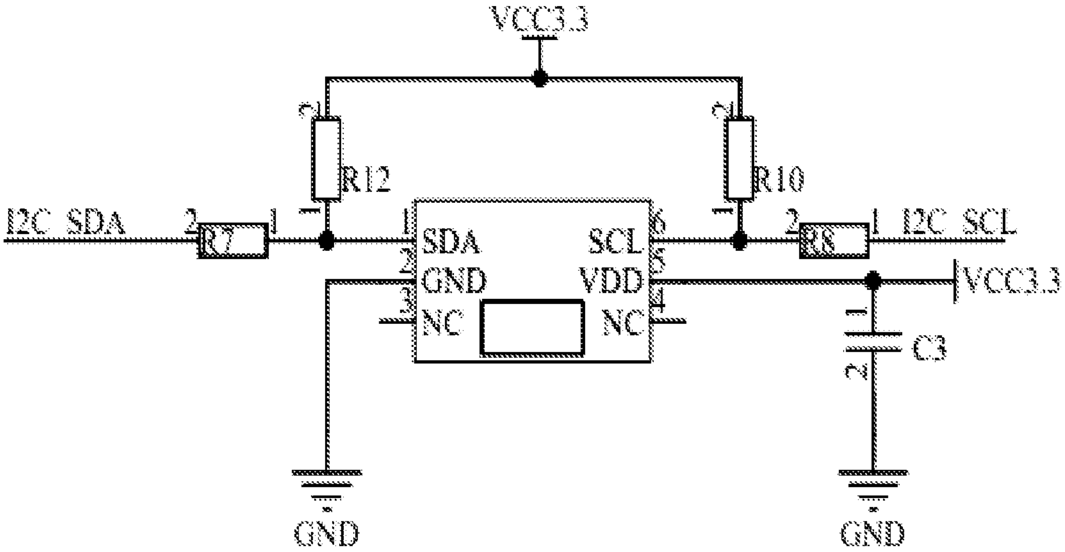
FIG. 11 is a schematic circuit diagram of a temperature and humidity detection module according to an embodiment of the present application.

The specific circuit of the temperature and humidity detection module 404 is shown in FIG. 11. The resistor R7 and the resistor R12 are connected to the interface 1 of the temperature and humidity sensor, and the terminal of the resistor R7 not connected to the temperature and humidity sensor is connected to the host computer 204. The resistors R8 and R10 are connected to the interface 6 of the temperature and humidity sensor, and the terminal of the resistor R8 not connected to the temperature and humidity sensor is connected to the host computer 204. The resistors R10 and R12 are pull-up resistors at the I2C bus, and are connected to the voltage VCC (3.3V). The interface 5 of the temperature and humidity sensor is connected to the voltage VCC (3.3V), and is grounded via the capacitor C3. The interface 2 of the temperature and humidity sensor is grounded. The capacitor C3 is a high-frequency filter capacitor for stabilizing the voltage VCC (3.3V). A detection chip is provided inside the temperature and humidity sensor, and the temperature and humidity sensor sends the detected temperature data and humidity data to the host computer 204 via the interface 1 and the interface 6 through the I2C bus communication protocol with SDA and SCL lines.

In an embodiment, the temperature and humidity sensor may be an HDC1080 sensor. The HDC1080 sensor is a digital humidity sensor integrated with a temperature sensor, which has high measurement accuracy and low power consumption. The HDC1080 sensor has a measurement resolution of 14 bits, a relative humidity accuracy of +2%, and a temperature accuracy of ±0.2° C. When the HDC1080 sensor operates, the average current ranges from 0.7 uA to 1.3 uA, and the power supply voltage ranges from 2.7V to 5.5V. The HDC1080 sensor has high voltage compatibility and does not require additional level conversion control chips.

Figure 12:
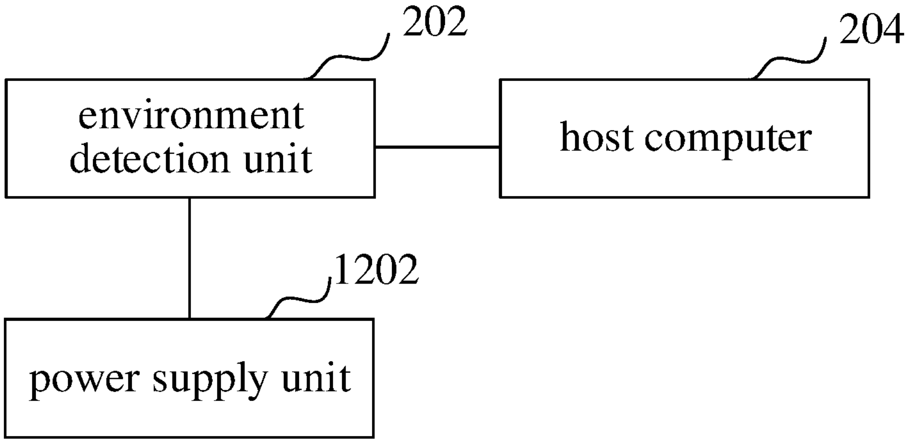
FIG. 12 is a structural schematic diagram of the safety protection device for the LED display screen according to yet another embodiment of the present application.

In an embodiment, as shown in FIG. 12, the safety protection device 102 for the LED display screen further includes a power supply unit 1202, and the power supply unit 1202 is connected to the environment detection unit 202.

Figure 13:
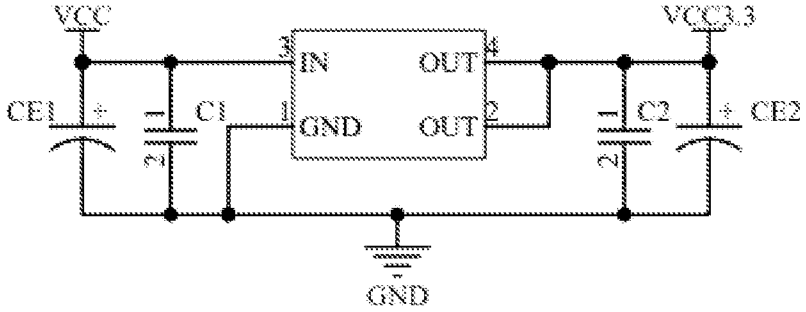
FIG. 13 is a schematic circuit diagram of a power supply unit according to an embodiment of the present application.

The power supply unit 1202 is used to supply power to the environment detection unit 202. In an embodiment, the specific circuit structure is shown in FIG. 13. The power supply unit 1202 includes a capacitor CE1, a capacitor C1, a voltage regulator chip, a capacitor C2, and a capacitor CE2. The first terminal of the capacitor CE1 connected in parallel with the capacitor C1 is connected to the input terminal of the voltage regulator chip, and the second terminal of the capacitor CE1 connected in parallel with the capacitor C1 is connected to the grounded terminal of the voltage regulator chip and is grounded. The first terminal of the capacitor CE2 connected in parallel with the capacitor C2 is connected to the output terminal of the voltage regulator chip, and the second terminal of the capacitor CE2 connected in parallel with the capacitor C2 is grounded. The voltage VCC (the voltage value is not limited, which should be based on the rated input voltage of the voltage regulator chip) is input to the input terminal of the voltage regulator chip. After being adjusted by the voltage regulator chip, the adjusted voltage VCC (3.3V) is output from the output terminal of the voltage regulator chip. The capacitor CE1, C1, C2 and CE2 are used for filtering the voltage.

In an embodiment, there may be a plurality of output terminals of the voltage regulator chip. When there are two or more output terminals of the voltage regulator chip, the output terminals of each voltage regulator chip are connected to the first terminal of the capacitor CE2 connected in parallel with the capacitor C2. In an embodiment, the voltage regulator chip may be a TLV1117LV-3.3 chip. The quiescent current of the TLV1117LV-3.3 chip is lower than that of the traditional voltage regulator, and the TLV1117LV-3.3 chip is an ultra-low power consumption element and can enhance the stability of voltage supply.

Figure 14:
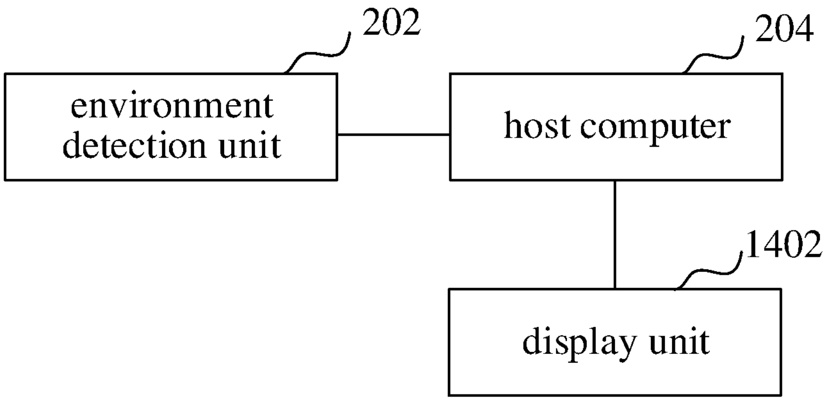
FIG. 14 is a structural schematic diagram of the safety protection device for the LED display screen according to yet another embodiment of the present application.

In an embodiment, as shown in FIG. 14, the safety protection device 102 for the LED display screen further includes a display unit 1402, and the display unit 1402 is connected to the host computer 204. After the host computer 204 receives the environmental data, the environmental data can be displayed through the display unit 1402, so that the operating personnel can check the environmental data of the environment where the LED display screen 104 is located. Further, the display unit 1402 can be provided at the host computer 204, or can be provided at other positions convenient for operating personnel to check.

In an embodiment, the display unit 1402 is a colored LED indicator light. When the environmental data is greater than the preset environmental threshold, the display unit 1402 lights up a red LED indicator light. When the environmental data is less than or equal to the preset environmental threshold, the display unit 1402 lights up the green LED indicator light. The display unit 1402 can also be a display screen, and when the environmental data is greater than the preset environmental threshold, the display unit 1402 may remind the operating personnel of checking and repairing the LED display screen 104.

To better understand the above technical solution, based on the application scenario shown in FIG. 1, a detailed explanation will be given below in combination with a specific embodiment.

The safety protection device of the LED display screen includes an environment detection unit, a host computer, an alarm unit, a power supply unit, and a display unit. The environment detection unit includes a smoke detection module and a temperature and humidity detection module (as shown in FIG. 4). The smoke detection module includes a smoke sensor, a heating circuit, an integrating circuit, a reset circuit, a converter, an output circuit, a test circuit and an indication circuit. The specific circuit structure and connection relationship are shown in FIG. 7 to FIG. 10 as described above, which will not be repeated here. The temperature and humidity detection module includes a temperature and humidity sensor, and the specific circuit structure and connection relationship are shown in FIG. 11 as described above, which will not be repeated here. The specific circuit structure and connection relationship of the power supply unit are shown in FIG. 13 as described above, which will not be repeated here.

In an embodiment, as shown in FIG. 1, an LED display system is provided, which includes an LED display screen 104 and the safety protection device 102 for the LED display screen as mentioned above.

The safety protection device 102 for the LED display screen is provided at the LED display screen 104, and the operation environment of the LED display screen 104 may be an outdoor or indoor environment with high altitude, high temperature, drought, humidity, and strong wind. In an embodiment, to ensure the smooth and safe operation of the LED display screen 104, the safety protection device 102 for the LED display screen detects the environmental data of the environment where the LED display screen 104 is located, and reduces the workload of the LED display screen 104 when the environmental data is greater than the preset environmental threshold. The model and size of the LED display screen 104 are not limited, as long as the environmental data of the LED display screen 104 can be detected by the safety protection device 102 for the LED display screen. When the volume of the LED display screen 104 is too large, a plurality of safety protection devices 102 for the LED display screen can be installed to detect the divided areas of the LED display screen 104.

In this embodiment, the safety protection device 102 for the LED display screen in the LED display system is used to detect the environmental data of the environment where the LED display screen 104 is located, and reduce the workload of the LED display screen 104 when the environmental data is greater than the preset environmental threshold. By adjusting the workload of the LED display screen 104 when the environmental data is greater than the preset environmental threshold, fire and similar accidents can be avoided, and the operation safety of the LED display screen 104 can be ensured as much as possible.

The various technical features of the above-mentioned embodiments can be combined arbitrarily. To make the description concise, all possible combinations of the various technical features in the above-mentioned embodiments are not described. However, as long as there is no contradiction in the combination of these technical features, the combination should fall within the scope of the present application.

The above-mentioned embodiments only express several implementation modes of the present application, and the description thereof is relatively specific and detailed, but it should not be considered as a limit to the scope of the present application. It should be noted that those skilled in the art can make several modifications and improvements without departing from the concept of the present application, and these all fall within the scope of the present application. Therefore, the protection scope of the patent application should be based on the appended claims.

What is claimed is:

1. A safety protection device for a light-emitting diode (LED) display screen, comprising:

an environment detection unit, configured to detect environmental data of an environment where the LED display screen is located; and a host computer, configured to receive the environmental data, and reduce a workload of the LED display screen in response to that the environmental data is greater than a preset environmental threshold, wherein the environment detection unit is provided at the LED display screen and connected to the host computer, and the host computer is connected to the LED display screen;

the host computer is a chip, the chip is configured to compare the environmental data with the preset environmental threshold and output a safety instruction in response to that the environmental data is greater than the preset environmental threshold;

the safety instruction comprises a power-off instruction and a low energy consumption instruction, the power-off instruction is configured to control the LED display screen to disconnect from a power supply and reduce the workload of the LED display screen to zero, and the low energy consumption instruction is configured to control the LED display screen to switch to a low energy mode.

2. The safety protection device for the LED display screen of claim 1, further comprising an alarm unit connected to the host computer, wherein the host computer is configured to send an alarm instruction to the alarm unit in response to that the environmental data is greater than the preset environmental threshold.

3. The safety protection device for the LED display screen of claim 2, wherein the alarm unit is configured to generate alarm information, the alarm information comprises sound alarm information, optical alarm information, or vibration alarm information.

4. The safety protection device for the LED display screen of claim 2, wherein the alarm unit comprises an audible and visual alarm, a vibration alarm, or an intelligent cloud alarm.

5. The safety protection device for the LED display screen of claim 1, wherein:

the environmental data comprises smoke concentration data, and the environment detection unit comprises a smoke detection module;

the smoke detection module comprises a smoke sensor and a converter;

the smoke sensor is provided at the LED display screen, and is connected to the host computer via the converter; and the converter is configured to receive the smoke concentration data sent by the smoke sensor, and send the smoke concentration data after format conversion to the host computer.

6. The safety protection device for the LED display screen of claim 5, wherein:

the converter is configured to convert smoke concentration data in an analog format into smoke concentration data in a digital format, and the host computer is configured to receive the smoke concentration data in the digital format sent by the converter.

7. The safety protection device for the LED display screen of claim 5, wherein:

the smoke detection module further comprises a reset circuit, a heating circuit, an integrating circuit and an output circuit;

the reset circuit is connected to the converter;

the heating circuit is connected to the converter and the smoke sensor, and is grounded;

the integrating circuit is connected to the converter and the smoke sensor, and is grounded; and the converter is configured to output the smoke concentration data after format conversion to the host computer via the output circuit.

8. The safety protection device for the LED display screen of claim 7, wherein:

the integrating circuit is configured to sense an operation state of the smoke sensor, obtain smoke concentration data and transmit smoke concentration data to the converter;

the converter is configured to convert smoke concentration data, and send converted smoke concentration data to the host computer via the output circuit; and the reset circuit is configured to ensure a stable operation of the converter and reset the converter to an initial state.

9. The safety protection device for the LED display screen of claim 5, wherein the smoke detection module further comprises a test circuit and an indication circuit, and both the test circuit and the indication circuit are connected to the converter.

10. The safety protection device for the LED display screen of claim 5, wherein:

the environmental data comprises temperature and humidity of the LED display screen;

the environment detection unit comprises a temperature and humidity detection module; and the temperature and humidity detection module is provided at the LED display screen, and is connected to the host computer.

11. The safety protection device for the LED display screen of claim 10, wherein:

a smoke concentration threshold, a temperature threshold and a humidity threshold are stored in the host computer, the smoke concentration threshold ranges from 1000 ppm to 2000 ppm, the temperature threshold ranges from 65° C. to 75° C., and the humidity threshold is a humidity of 90%.

12. The safety protection device for the LED display screen of claim 1, further comprising a power supply unit connected to the environment detection unit.

13. The safety protection device for the LED display screen of claim 12, wherein the power supply unit comprises a voltage regulator chip, and the voltage regulator chip comprises a plurality of output terminals.

14. The safety protection device for the LED display screen of claim 1, further comprising a display unit connected to the host computer.

15. The safety protection device for the LED display screen of claim 14, wherein the display unit is a colored LED indicator light, the colored LED indicator light is configured to light up a red LED indicator light in response to that the environmental data is greater than the preset environmental threshold, and the colored LED indicator light is configured to light up a green LED indicator light in response to that the environmental data is less than or equal to the preset environmental threshold.

16. A light-emitting diode (LED) display system, comprising an LED display screen and the safety protection device for the LED display screen of claim 1.

* * * * *